(12) United States Patent
Uehira et al.

(10) Patent No.: US 10,132,926 B2
(45) Date of Patent: Nov. 20, 2018

(54) RANGE FINDER, MOBILE OBJECT AND RANGE-FINDING METHOD

(71) Applicants: Masataka Uehira, Kanagawa (JP); Atsufumi Omori, Kanagawa (JP); Kohji Sakai, Tokyo (JP)

(72) Inventors: Masataka Uehira, Kanagawa (JP); Atsufumi Omori, Kanagawa (JP); Kohji Sakai, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 712 days.

(21) Appl. No.: 14/658,541

(22) Filed: Mar. 16, 2015

(65) Prior Publication Data

US 2015/0268343 A1 Sep. 24, 2015

(30) Foreign Application Priority Data

Mar. 19, 2014 (JP) .................................. 2014-055726

(51) Int. Cl.
*G01S 17/10* (2006.01)
*G01S 7/484* (2006.01)
*G01S 7/486* (2006.01)

(52) U.S. Cl.
CPC .............. *G01S 17/10* (2013.01); *G01S 7/484* (2013.01); *G01S 7/4868* (2013.01)

(58) Field of Classification Search
CPC ............ H05B 33/0818; H05B 33/0848; H05B 33/0815; H05B 33/0824; H05B 33/083; G01S 17/10; G01S 7/484; G01C 3/08; Y02B 20/347; H02M 7/42
See application file for complete search history.

(56) References Cited

U.S. PATENT DOCUMENTS

| 3,937,575 A * | 2/1976 | Bateman ................. G01S 17/10 250/214 SG |
| 2012/0236373 A1* | 9/2012 | Oyama .............. H04N 1/40056 358/475 |
| 2014/0211192 A1* | 7/2014 | Grootjans .......... H05B 33/0818 356/5.01 |

FOREIGN PATENT DOCUMENTS

JP 2012-93195 5/2012

* cited by examiner

*Primary Examiner* — Luke D Ratcliffe
(74) *Attorney, Agent, or Firm* — Oblon, McClelland, Maier & Neustadt, L.L.P.

(57) ABSTRACT

A range finder which irradiates a subject by emission of a light source, and receives reflected light from the subject so as to measure a distance to the subject, the range finder includes a plurality of light-source-driving circuits supplying a driving current to the light source when a light-emitting signal that controls the emission of the light source is input, wherein the light-emitting signal is output to one of the light-source-driving circuits, and each of the light-source-driving circuits has a different response speed to the light-emitting signal.

11 Claims, 9 Drawing Sheets

RANGE FINDER, MOBILE OBJECT AND RANGE-FINDING METHOD

CROSS-REFERENCE TO RELATED APPLICATION

The present application is based on and claims priority from Japanese Patent Application No. 2014-055726, filed on Mar. 19, 2014, the disclosure of which is hereby incorporated by reference herein in its entirety.

BACKGROUND

Field of the Invention

The present invention relates to a range finder, a mobile object, and a range-finding method. Particularly, the present invention relates to a range finder which irradiates a subject by emission of a light source, and receives reflected light from the subject so as to measure a distance to the subject, the mobile object including the range finder, and the range-finding method for measuring the distance.

A laser radar which measures a distance from a subject by irradiating the subject with light which is emitted from a light source and receiving reflected light from the subject is conventionally known (for example, refer to Patent Document 1, Japanese Patent Application Laid-open No. 2012-93195).

However, there is room for improvement regarding the laser radar disclosed in Patent document 1 in terms of the accuracy of the range-finding operation to the subject.

SUMMARY

The present invention aims to provide a range finder which irradiates a subject by emission of a light source, and receives reflected light from the subject so as to measure a distance to the subject, the range finder comprising a plurality of light-source-driving circuits supplying a driving current to the light source when a light-emitting signal that controls the emission of the light source is input, wherein the light-emitting signal is output to one of the light-source-driving circuits, and each of the light-source-driving circuits has a different response speed to the light-emitting signal.

BRIEF DESCRIPTION OF THE DRAWINGS

The accompanying drawings are included to provide further understanding of the invention, and are incorporated in and constitute a part of this specification. The drawings illustrate Embodiments of the invention and, together with the specification, serve to explain the principle of the invention.

DETAILED DESCRIPTION OF THE PREFERRED EMBODIMENT

Hereinafter, a range finder 100 according to Embodiment of the present invention will be described with reference to FIG. 1 to FIG. 6.

Figure 1:
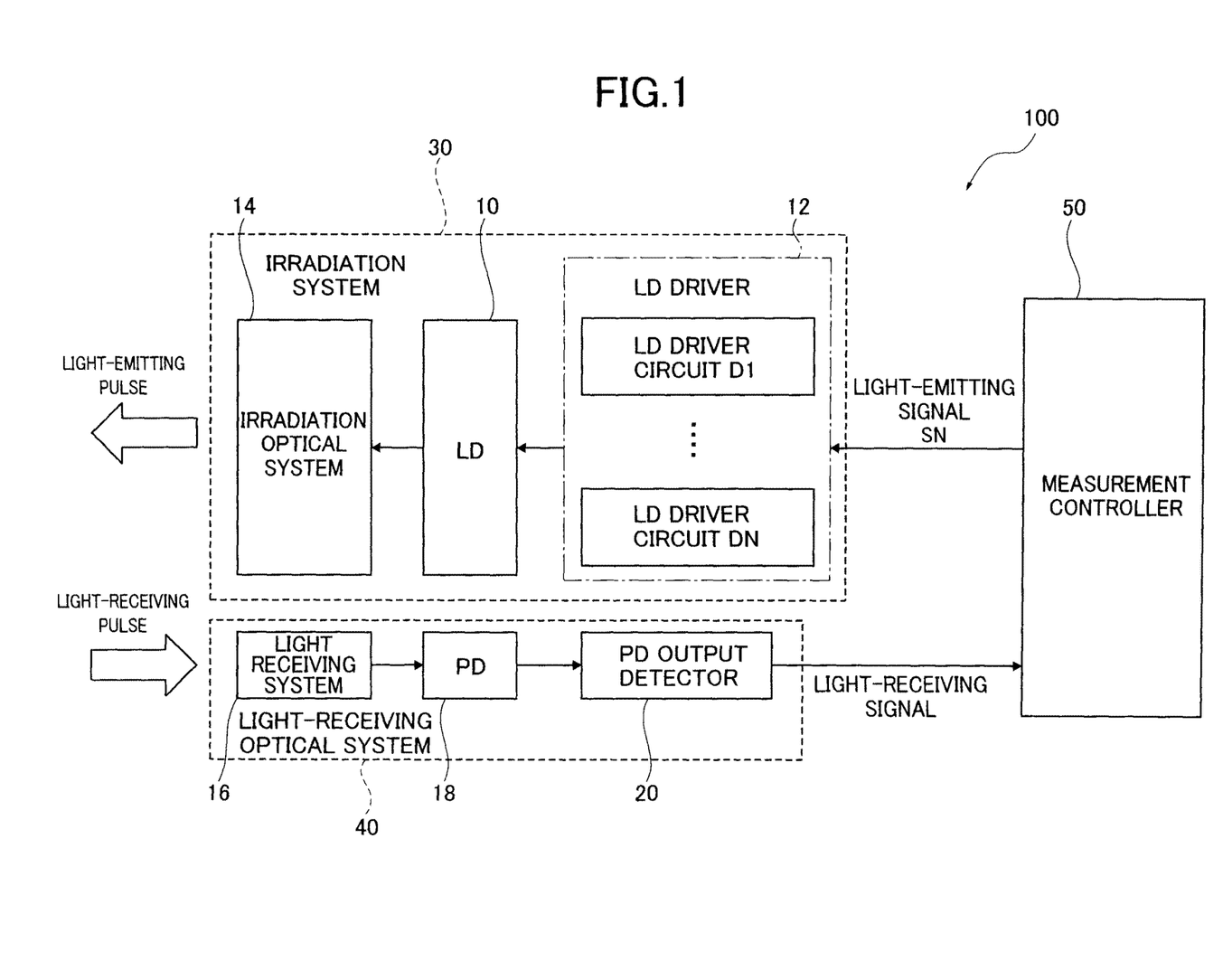
FIG. 1 is a diagram schematically illustrating a configuration of a range finder according to Embodiment.

FIG. 1 illustrates a schematic configuration of the range finder 100 in a block chart.

As an example, the range finder 100 is mounted on an automobile as a mobile object. The range finder 100 irradiates a subject (preceding automobile, obstacle, or pedestrian, for example) by emission of a light source and receives reflected light from the subject so as to measure a distance to the subject.

As shown in FIG. 1, the range finder 100 includes, as an example, an irradiation system 30, a light-receiving system 40, and a measurement controller 50.

The range finder 100 is connected to an ECU (Electronic Control Unit) of the automobile as an example, measures the distance to the subject according to a demand from the ECU (demand for range-finding operation), and outputs the measurement result (distance information) to the ECU. The ECU performs motion control of the automobile (speed control and steering control or the like) according to the input measurement result.

The irradiation system 30 includes, as an example, an LD 10 (laser diode) as the light source, an LD driver 12 which drives the LD 10, and an irradiation optical system 14. The LD 10 is a type of semiconductor laser and is referred to as an end surface-emitting laser.

The measurement controller 50 outputs a light-emitting signal (for example, a rectangular pulse signal) to the LD driver 12 to control an emission of the LD 10 upon receiving the demand for a range-finding operation from the ECU.

When the light-emitting signal from the measurement controller 50 is input, the LD driver 12 supplies (applies) a driving current (rectangular pulse current or the like) for the LD 10, thereby the pulse-light is emitted. Herein, a pulse range of the laser beam (emitting pulse) periodically emitted from the LD 10 is about several ns to 50 ns, for example. A pulse period is several μs to 50 μs, for example.

Figure 2:
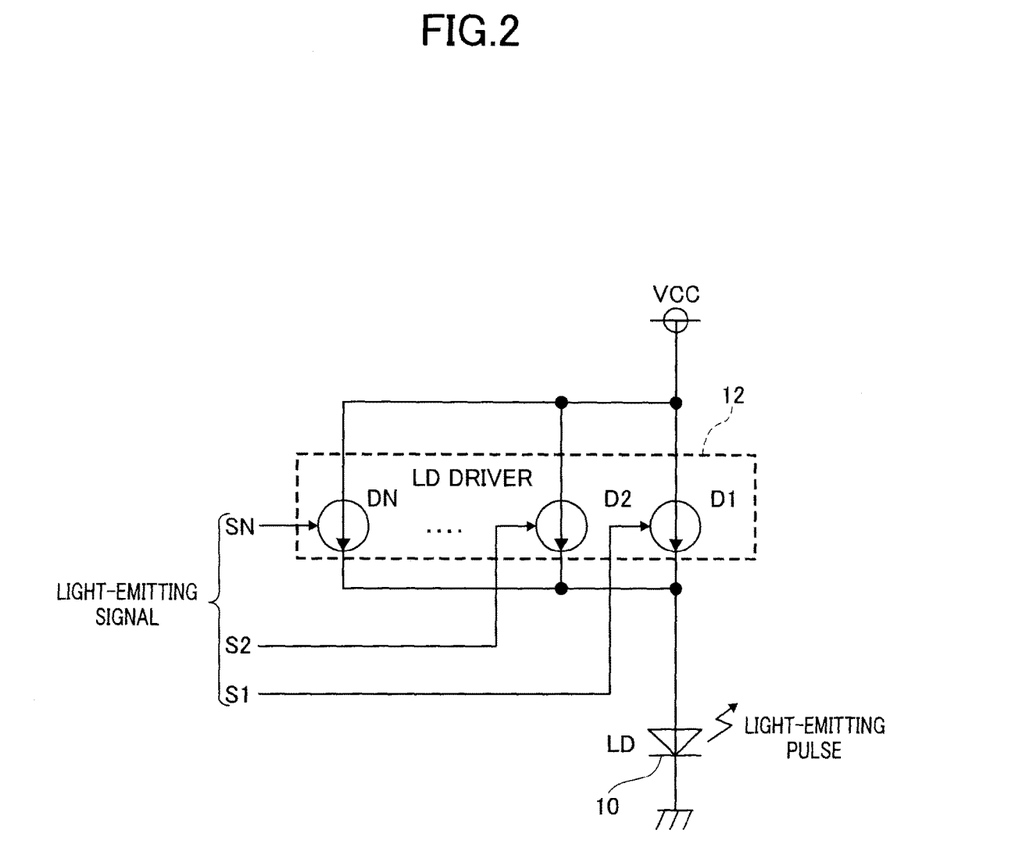
FIG. 2 is an explanatory diagram illustrating an LD driver.

In detail, as shown in FIG. 2, the LD driver 12 includes N (N is integer of 2 or more) LD driver circuits D1 to DN which are connected in parallel with each other.

Each LD driver circuit is connected in series with the LD 10 so as to apply the driving current in a forward direction of the LD 10.

Each LD driver circuit includes a transistor as a current source of the driving current. The ON/OFF control of the power distribution to the LD 10 is performed by turning ON/OFF the transistor.

The ON/OFF control of the transistor in each LD driving circuit is performed by the light-emitting signal from the measurement controller 50. That is, the transistor is turned on by the high-level light-emitting signal, and the transistor is turned off by the low-level light-emitting signal.

That is, each LD driver circuit supplies the driving current to the LD 10 when the light-emitting signal is input.

Herein, the measurement controller 50 outputs a light-emitting signal Sn (1≤n≤N) to one LD driver circuit Dn ($1 \leq n \leq N$) among the N LD driver circuits D1 to DN. Namely, the measurement controller 50 selects from among the N LD driver circuits one LD driver circuit to be a target for outputting the light-emitting signal.

Herein, N light-emitting signals S1 to SN are rectangular pulse signals which are essentially similar to each other. In this instance, a current value of each base current supplied to the transistor in each LD driver circuit is approximately the same.

In addition, current amplification factors C1 to CN of the transistors in the N LD driver circuits D1 to DN are different from each other. In the present Embodiment, the current amplification factor is C1>C2> . . . >CN, as an example.

Herein, target current values (amplitudes) I1 to IN for the driving currents (rectangular pulse current) of N LD driver circuits D1 to DN are different from each other. In the present Embodiment, the target current values are I1>I2> . . . >IN, as an example.

In order to detect the subject accurately, it is preferable to output high-output pulse light of about several 10 W to 100 W from the LD according to the distance to the subject (several tens of meters to hundred meters, for example). That is, it is preferable to set the target current value for the driving current to be several 10 A to 100 A, for example.

As described later, as the current amplification factor of the transistor in each LD driver circuit becomes higher, the response time of the LD driver circuit to the light-emitting signal becomes longer (response speed is low). On the other hand, as the current amplification factor of the transistor in each LD driver circuit becomes smaller, the response time of the LD driver circuit to the light-emitting signal becomes shorter (response speed is high).

That is, the response times Tr1 to TrN of the N LD driver circuits D1 to DN to the corresponding light-emitting signals S1 to SN are different from each other. Herein, Tr1>Tr2> . . . >TrN is satisfied as an example (refer to FIG. 3A and FIG. 3B).

"The response time to the light-emitting signal" represents a required time from a point in which the optical output becomes 10% of a peak output to a point in which the optical output becomes 90% of the peaking capacity on the rising of a light emitting pulse from the LD, for example.

A laser beam (light-emitting pulse) emitted from the LD 10 is guided by the irradiation optical system 14 so as to irradiate the subject.

In detail, the irradiation optical system 14 includes, as an example, an irradiation lens (coupling lens) arranged on an optical path of the laser beam emitted from the LD 10 to control light dispersion of the laser beam, and an optical deflector (polygon mirror, galvano mirror, and MEMS mirror or the like) arranged on the optical path of the laser beam through the irradiation lens.

Then, the laser beam emitted from the LD 10 is deformed by the irradiation lens to be a laser beam having a predetermined beam profile. The deformed laser beam is deflected by the optical deflector in a horizontal plane, for example. Then the subject is irradiated with the laser beam. That is, the subject is scanned in the horizontal direction by the laser beam, for example. As a result, the range-finding operation can be performed over the larger area of the subject in the horizontal direction.

The light-receiving system 40 includes a light-receiving optical system 16 and a PD 18 (photo detector) as a light-receiving element, and a PD output detector 20.

The laser beam emitted on the subject is reflected (dispersed) on the subject. A part of the reflected light (dispersed light) is guided to the PD 18 through the light-receiving optical system 16.

As an example, the light-receiving optical system 16 includes a light-receiving lens (condenser lens, for example) so as to image an incident light among the reflected light from the subject (reflected light passing through the approximately the same light path with that of the laser beam emitted onto the subject after deflected by the optical deflector) on the PD 18.

The PD 18 outputs a light-receiving signal of an electric signal according to the light amount of the reflected light on the PD output detector 20 upon receiving the reflected light from the subject.

The PD output detector 20 executes two operations such as the signal amplification of the light-receiving signal and the timing detection of the light-receiving signal. The light-receiving signal is amplified by a signal-amplification equipment like an amplifier. The timing detection of the light-receiving signal is performed by a comparator or the like. A rising waveform when the light-receiving signal from the PD 18 exceeds the predetermined output (threshold level) or more is detected herein. The PD output detector 20 outputs the detected timing of the light-receiving signal (rising waveform) to the measurement controller 50 when the light-receiving signal is detected.

The measurement controller 50 outputs the light-emitting signal Sn ($1 \leq n \leq N$) to one LD driver circuit Dn, as described above. The measurement controller 50 estimates a time difference between the output timing of the light-emitting signal Sn and the detection timing of the light-receiving signal from the PD output detector 20 to be a round-trip distance to the subject (double range to the subject). By converting the time difference into distance, the round-trip distance to the subject and thus the distance to the subject are measured.

In detail, the measurement controller 50 has a clock function such that the measurement controller 50 begins timing on the rising of the light-emitting signal Sn and finishes timing on the detection timing of the light-receiving signal from the PD output detector 20. The time measured by such a clock function represents the time in which the laser beam passes (reciprocates) between the range finder 100 and the subject. By converting the time into distance, the round-trip distance to the subject can be measured. The pulse period of the driving signal is, for example, several μs to 50 μs. The measurement controller 50 measures the round-trip distance to the subject in real time.

The LD driver 12 is described herein in detail. As described above, the LD driver 12 includes N LD driver circuits D1 to DN. The response time of each of the LD driver circuits D1 to DN to the corresponding light-emitting signals S1 to SN is set to be Tr1 to TrN.

In order to obtain the light-emitting pulse from the LD, a high current is supplied momentarily by the current source such as the transistor configuring the LD driver circuit. Particularly, when it is configured to supply a large amount of current to the LD in order to correspond to the longer range-finding operation, it is necessary to supply a large current amount (current capacity) which is acceptable for the transistor or the LD. However, generally, the current capacity (current amplification factor) of the transistor and the response speed are in a trade-off relationship, and it is difficult to arrange both current capacity and response speed of one type of the LD driver circuit including the transistor to be the intended amount according to the element characteristics of the transistor.

For example, as the transistor used in the LD driver circuit has a large current capacity (current amplification factor) and has a lower response speed, the response time to the light-emitting pulse and a light-receiving pulse (light-receiving signal) becomes longer. Therefore, a time error at which the leading edge waveform of the light-receiving pulse corresponding to each light-emitting pulse exceeds the threshold (threshold level) becomes larger, and an error readily occurs in a measurement distance. That is, when considering detection of the longer distance in the LD driver circuit as a priority, the range resolution in a short range deteriorates.

In the present Embodiment, it is possible to select an LD driver circuit of a short-time response when a high-speed response light-emitting pulse is required, for example. It is possible to select an LD driver circuit of a long-time response which can supply a large current when a high-output light-emitting pulse is required. Namely, it is possible to select preferably an LD driver circuit which has a preferable current-capacity and preferable response-speed.

Figure 3A:
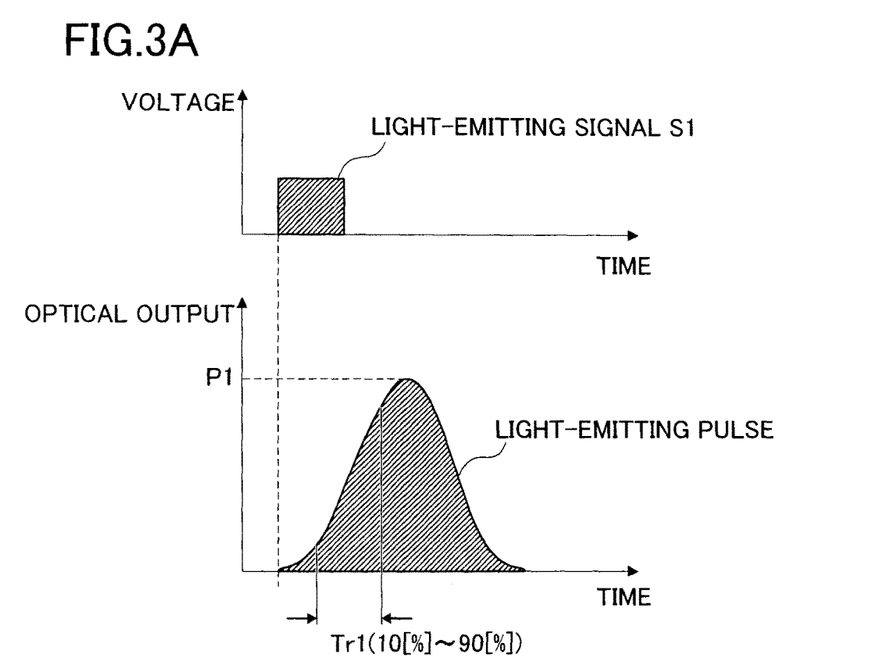
FIG. 3A and FIG. 3B are graphs illustrating light-emitting signals S1 and SN and corresponding light-emitting pulses for each.
Figure 3B:
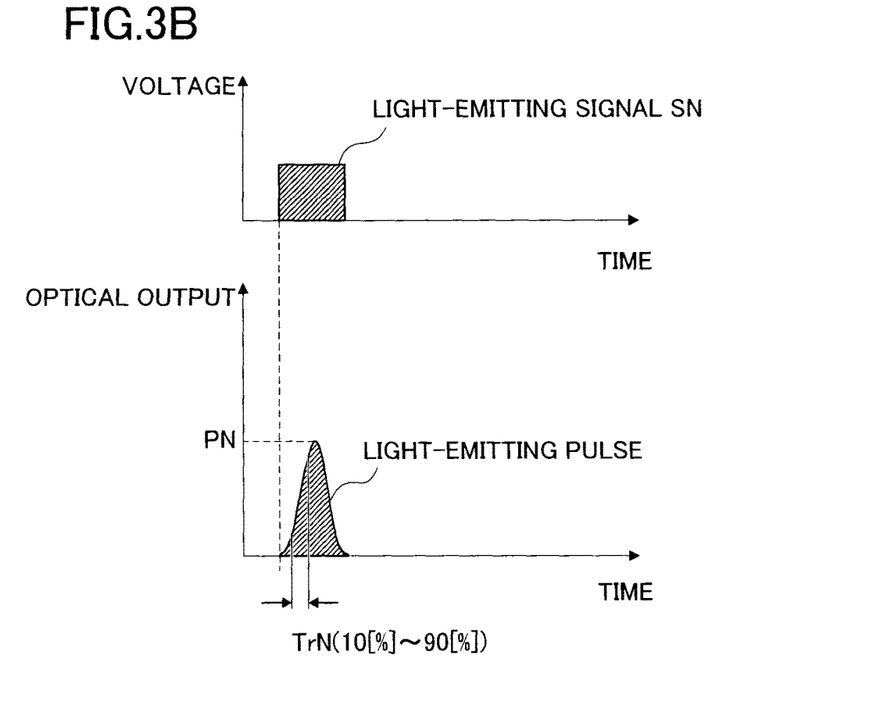

Next, the response time of each of the LD driver circuits to the corresponding light-emitting signal will be described. FIG. 3A illustrates the light-emitting signal S1 which is output to the LD driver circuit D1 having a response time Tr1, and the light-emitting pulse from the LD 10 driven by the LD driver circuit D1 which receives the light-emitting signal S1. FIG. 3B illustrates the light-emitting signal SN which is output to the LD driver circuit DN having a shorter response time TrN than the response time Tr1, and the light-emitting pulse from the LD 10 driven by the LD driver circuit DN which receives the light-emitting signal SN.

According to the above-described element characteristic of the transistor for driving the LD 10, when Tr1>Tr2> . . . >Tr is satisfied, P1>P2> . . . >PN is satisfied, where the peak light outputs of the LD driver circuits D1 to DN having the response time of Tr1 to TrN are P1 to PN.

Hereinafter, the effect of the response time of the optical waveform on the range resolution (range-finding accuracy) on a range-finding operation (distance measurement) will be described with reference to FIG. 4A and FIG. 4B.

Figure 4A:
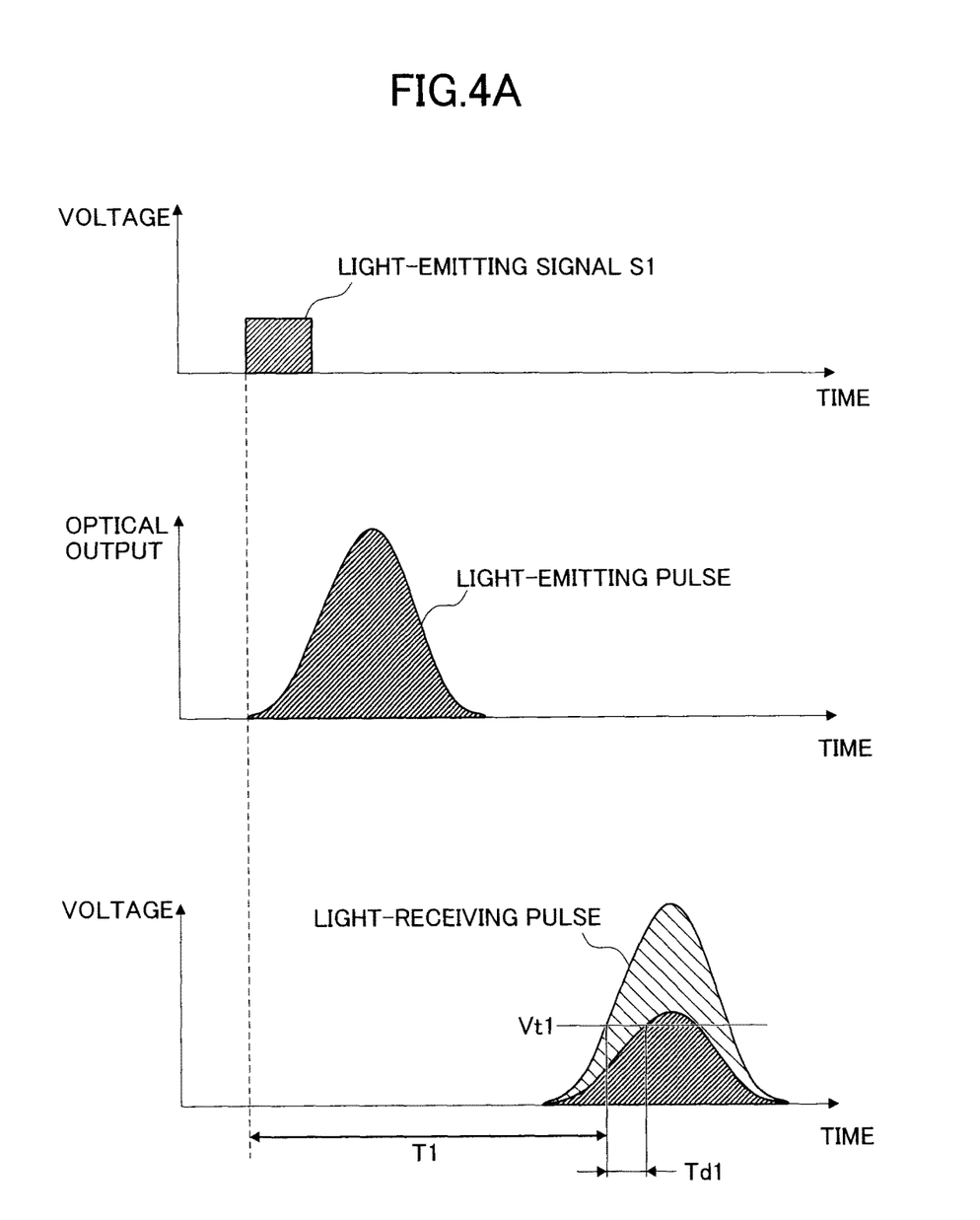
FIG. 4A and FIG. 4B are graphs illustrating the light-emitting signals S1 and SN, the corresponding light-emitting pulses, and corresponding light-receiving pulses for each.
Figure 4B:
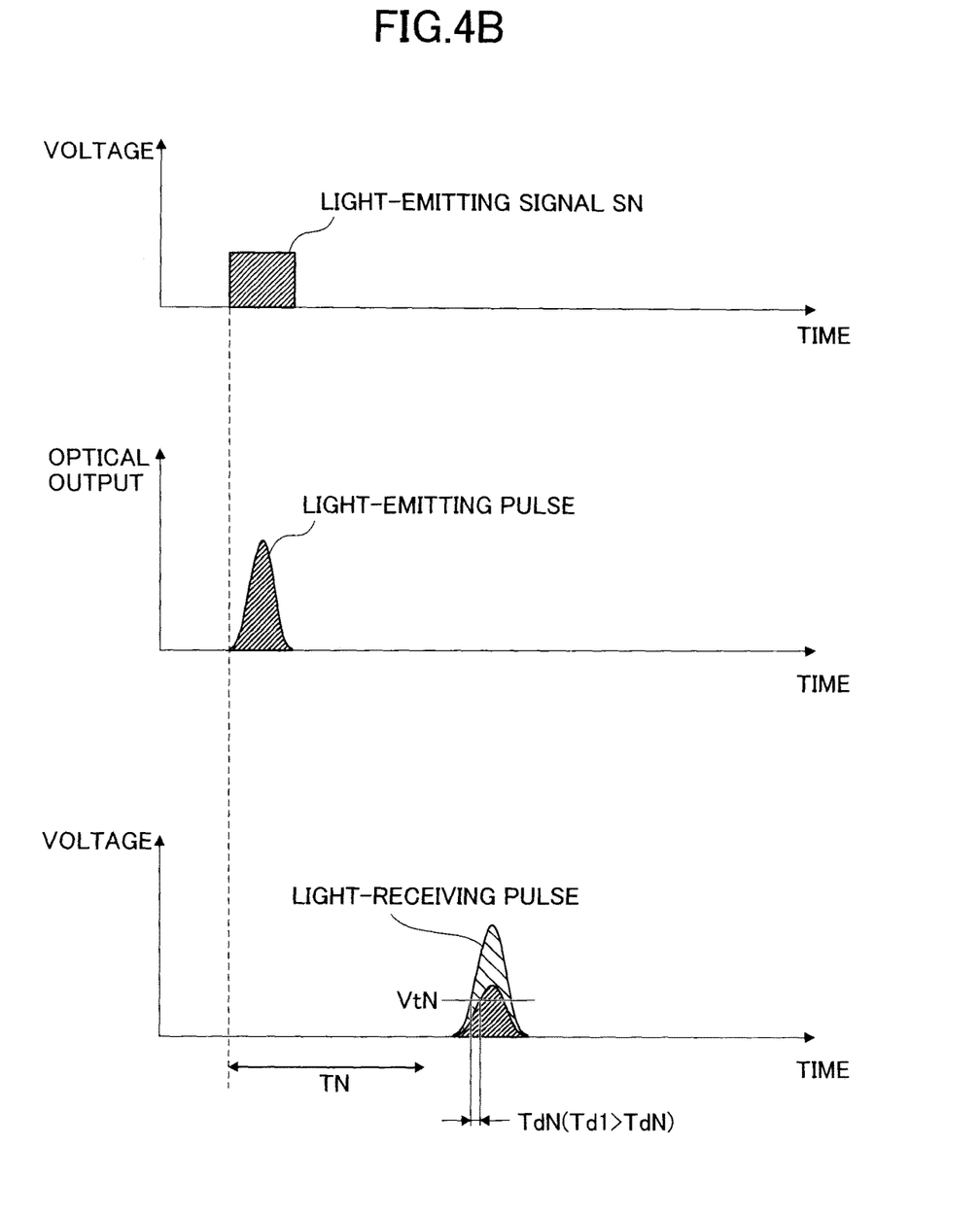

For example, in the range-finding operation using the LD driver circuit D1 having the response time Tr1 as shown in FIG. 4A, when the signal strength of the light-receiving pulse is reduced by half by the variation in the reflectance of the subject (reflection position change), the time error Td1 occurs between the rising timing (ON-timing) of the light-emitting signal and the timing in which the signal strength exceeds the threshold Vt1. When the measurement distance obtained by the Time-Of-Flight method is L1, and when a velocity of light is c, using a time difference T1 between the rising timing of the last light-emitting signal and the detection timing of the last light-receiving pulse corresponding to the light-emitting signal, the condition $L1=c(T1+Td1)/2$ is satisfied. In this instance, it can be assumed that the range resolution in the range finder 100 depends on the time error Td1.

On the other hand, in the range-finding operation using the LD driver circuit DN having the response time TrN (TrN<Tr1), for example, the time error between the rising timing of the light-emitting signal and the timing in which the rising waveform of the light-receiving pulse exceeds the threshold VtN is represented as TdN. Herein, where the measurement distance is LN and the optical velocity is c, the following condition $LN=c(TN+TdN)/2$ is satisfied. When the response time is Tr1>TrN, the time error is therefore Td1>TdN. Thereby, the range resolution in the range-finding operation performed by the LD driver circuit DN having the response time TrN is relatively higher compared with the range resolution in the range-finding operation performed by the LD driver circuit D1 having the response time Tr1.

As is obvious from the above description, the range resolution in the range-finding operation becomes higher as the LD driver circuit as an output target of the light-emitting signal has a faster response time to the light-emitting signal.

Next, a selecting operation of the LD driver circuit according to the distance (range) to the subject will be described with reference to FIG. 5 and FIG. 6. The flow chart illustrated in FIG. 6 is based on a processing algorithm performed by the measurement controller 50.

Figure 5:
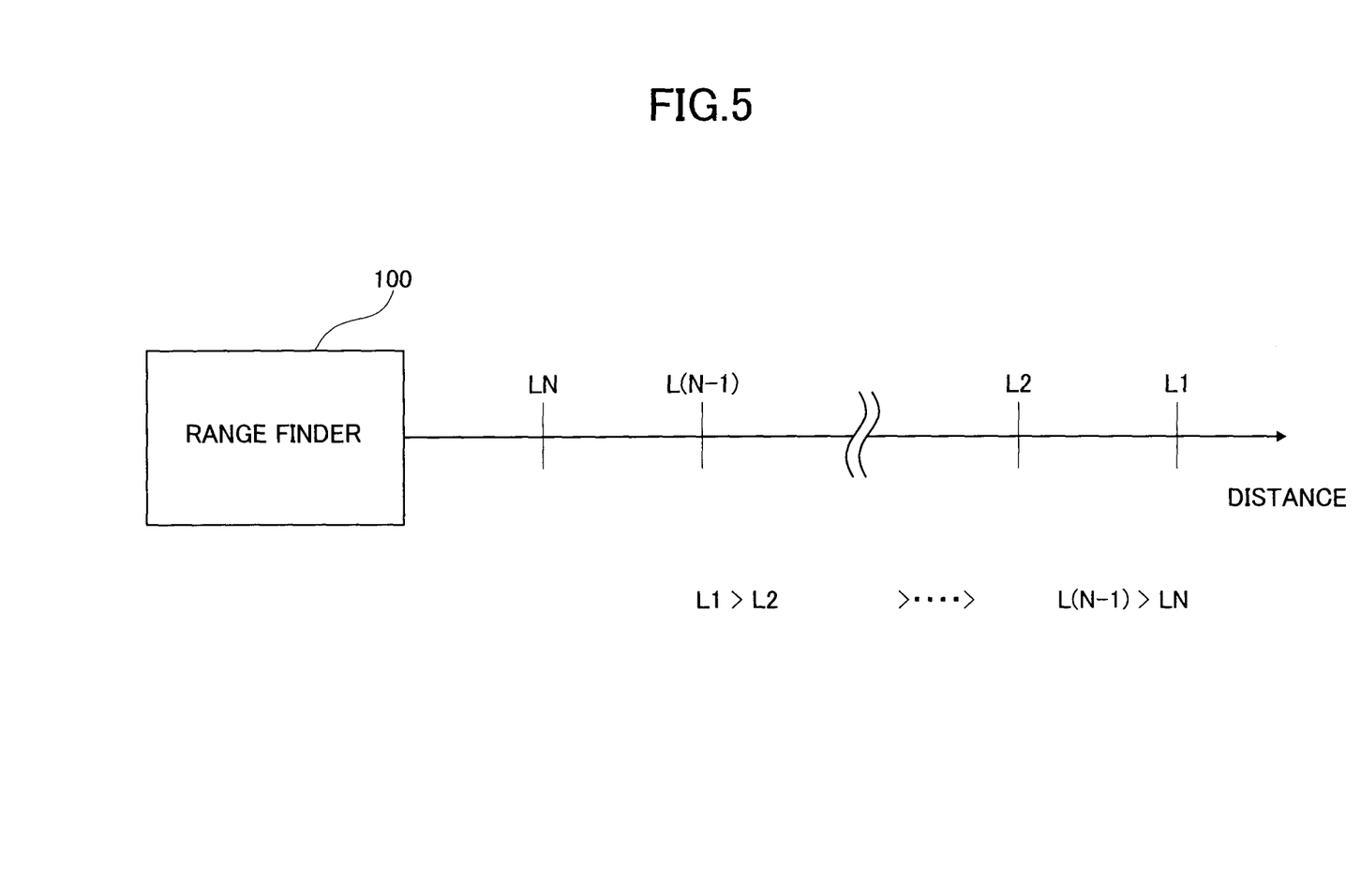
FIG. 5 is a diagram illustrating N thresholds L1 to LN of distances set by a measurement controller.
Figure 6:
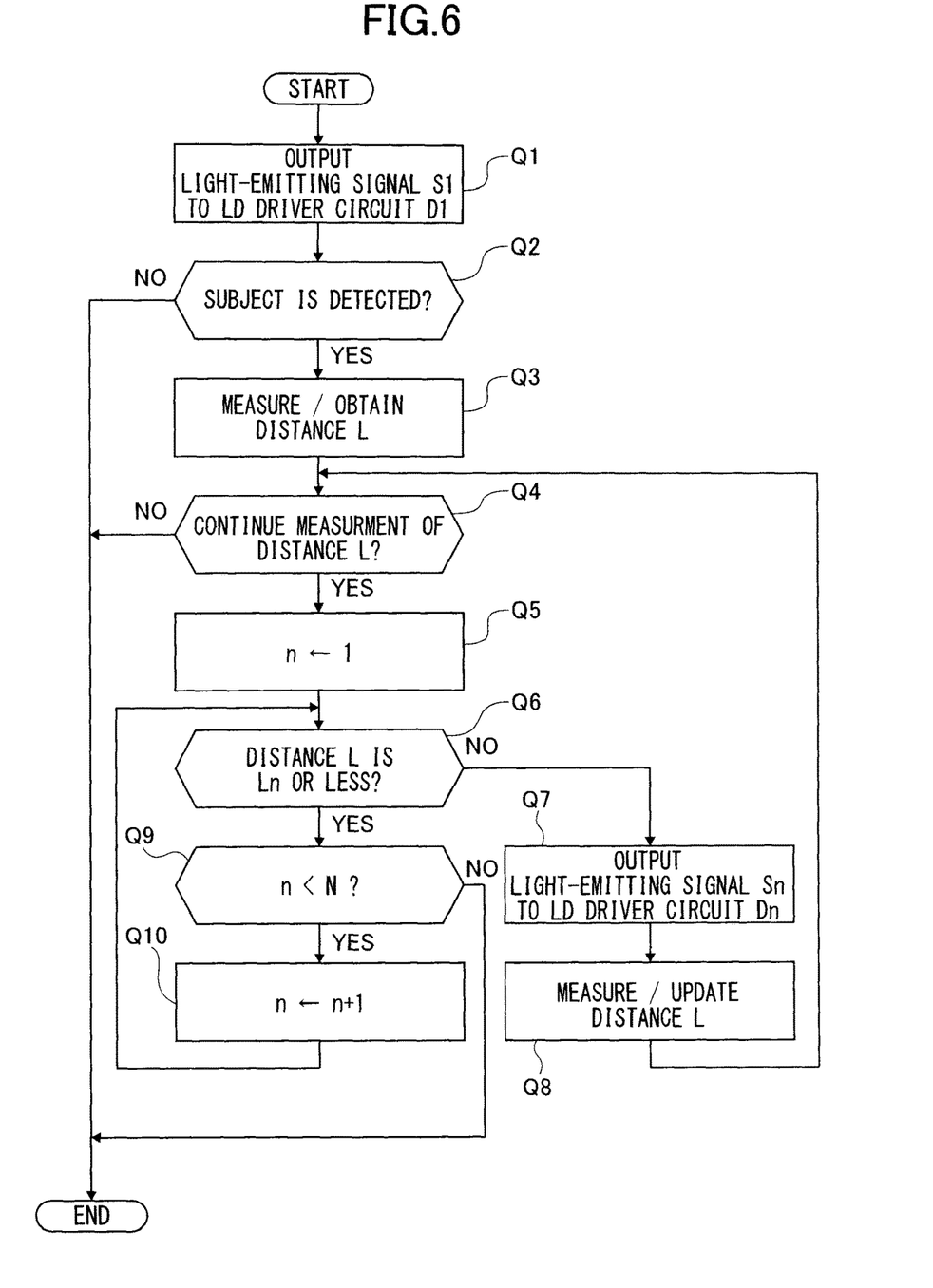
FIG. 6 is a flow chart illustrating a control process performed by the measurement controller.

As shown in FIG. 5, a state in which the distance L, which can be measured by the range finder 100, is separated into N−1 distance ranges of L2−L1, . . . , LN−L(N−1) is assumed. Herein, L1>L2> . . . >LN is satisfied. The operation in this instance starts upon starting up of the range finder 100.

In the first step Q1, the light-emitting signal S1 is output to the LD driver circuit D1. As a result, the driving current of the target current value I1 is supplied to the LD driver circuit D1 to LD 10 so that the LD 10 emits light of the optical output P1. Thus, in order to detect the subject accurately, firstly, the LD 10 is driven by the LD driver circuit D1 having the largest current capacity (highest output) for the driving current so that light of the optical output P1 is emitted.

In the next step Q2, it is determined whether the subject is detected or not. Herein, a positive detection is determined when the light-receiving signal from the PD 18 according to the light-emitting pulse of the optical output P1 emitted from the LD 10 is detected in the PD output detector 20. A negative detection is determined when such a light-receiving signal from the PD 18 is not detected in the PD output detector 20. For example, when the distance L to the subject is significantly longer than the distance L1 (100 meters, for example), the subject cannot be detected. When the determination is positive in the step Q2, the step then goes to the step Q3. On the other hand, when the determination is negative in the step Q2, the operation flow is terminated.

In the step Q3, the distance L to the subject is measured and obtained. Herein, the distance L is measured using the light-emitting pulse of the optical output P1 according to the light-emitting signal S1.

In the next step Q4, it is determined whether the measurement operation of the distance L is continued or not. Herein, the determination in the step Q4 is positive, for example, when an automatic driving-control mode of the automobile is selected by a user, and the determination is negative when such a mode is not selected. When the determination is positive in the step Q4, the step then goes to the step Q5. On the other hand, when the determination is negative in the step Q4, the operation flow is terminated.

In the step Q5, n is set to be 1. The step then goes to the step Q6 after the step Q5 is executed.

In the step Q6, it is determined whether the measured distance L is Ln or less. When the determination is negative in the step Q6, the step then goes to the step Q7. On the other hand, when the determination is positive in the step Q6, the step then goes to the step Q9.

In the step Q7, the light-emitting signal Sn is output to the LD driver circuit Dn. Thereby, the driving current of the target current value In ($1 \leq n \leq N$) is supplied to the LD 10 from the LD driver circuit Dn and the LD 10 emits light of the optical output Pn ($1 \leq n \leq N$). The step then goes to the step Q8 after the step Q7 is executed.

In the step Q8, the distance L is measured and updated (obtained) using the light-emitting pulse of the optical output Pn according to the light-emitting signal Sn. The updated distance L is output to the ECU of the automobile. The step then goes back to the step Q4 after the step Q8 is executed.

In the step Q9, n<N is determined. When the determination is positive in the step Q9, the step then goes to the step Q10. On the other hand, when the determination in the step Q9 is negative, the operation flow is terminated.

In the step Q10, n is incremented and then the step goes back to the step Q6 after the step Q10 is executed.

As described above, the light-emitting signal Sn is output to the LD driver circuit Dn having a preferable response speed and a preferable optical output according to the measured value of the distance L, that is, the distance range, and the LD 10 is driven by the LD driver circuit Dn. As a result, according to the distance to the subject, a preferable range resolution can be achieved while maintaining preferable optical output.

In the above-described step Q1, the light-emitting signal S1 is output to the LD driver circuit D1, but it is not limited to the above. It is preferable that the light-emitting signal be output to one of a plurality of LD driver circuits D1 to DN. In this instance, in order to detect the subject accurately, it is preferable that the light-emitting signal is output to the LD driver circuit which has a large capacity for the target current value (response speed to the light-emitting signal is low).

In addition, the step Q4 in the flowchart shown in FIG. 6 is not always performed. Namely, the step Q5 can be operated after the step Q3. In this instance the step then goes back to the step Q5 after the step Q8 is executed.

Herein, in the light of safety concerns, when the range finder 100 is used in the motion control of the automobile for example, the high accuracy is required in the range-finding operation as the distance to the subject is short. On the other hand, the required optical output becomes higher as the distance to the subject is longer.

From the first point of view, the range finder 100 according to the Embodiment of the present invention as described above is a range finder which irradiates the subject by the emission of the LD 10, and receives reflected light from the subject so as to measure the distance to the subject. The range finder 100 includes a plurality of (N) LD driver circuits which supply the driving current to the LD 10 when the light-emitting signal that controls the emission of the LD 10 is input. The light-emitting signal is output to one of the N LD driver circuits D1 to DN. The N LD driver circuits D1 to DN each have a different response time (response speed) to the light-emitting signal.

The range-finding method using the range finder 100 according to the Embodiment is a method for measuring the distance to the subject by irradiating the subject by the emission of the LD 10, and receiving the reflected light from the subject. The method includes a step of obtaining the distance to the subject by the emission of the LD 10 by outputting the light-emitting signal to one of a plurality of light-source driver circuits each having different response times (response speed) to the light-emitting signal that controls the emission of the LD 10. The method includes a step for measuring the distance to the subject by the emission of the LD 10 by outputting the light-emitting signal to the LD driver circuit having the response time according to the obtained distance.

According to the range finder 100 and the range-finding method of the Embodiment, the LD 10 can be driven by the LD driver circuit having a preferable response time (response speed) to the light-emitting signal according to the distance to the subject, for example. Thereby, any measurement error in the measured distance can be reduced.

As a result, the accuracy in the range-finding operation to measure the distance to the subject can be improved.

The N LD driver circuits D1 to DN each have a different target current value for the driving current. The response time of each N LD driver circuit D1 to DN becomes longer as the target current value becomes larger. In other words, the response speed to the light-emitting signal of each of the LD driver circuits becomes lower as the target current value for the LD driver circuit becomes larger.

In this instance, according to the distance to the subject, the LD 10 can be driven by the LD driver circuit having the above-described preferable target current value and preferable response time. Thereby, the range-finding operation (distance measurement) can be performed stably and accurately while achieving electrical power saving.

In addition, the range finder 100 further includes the measurement controller 50 which outputs the light-emitting signal to one of the N LD driver circuits D1 to DN so as to obtain (measure) the distance to the subject. The measurement controller 50 measures (re-measures) the distance to the subject by outputting the light-emitting signal to the LD driver circuit which has the preferable response time according to the obtained (measured) distance.

In addition, the measurement controller 50 outputs the light-emitting signal to the LD driver circuit having the shorter response time (response speed is low) as the obtained distance becomes shorter.

In addition, from the second point of view, the range finder 100 is a range finder which measures the distance to the subject by irradiating the subject with light by emitting light from the LD 10, and receiving the reflected light from the subject. The range finder includes a plurality of (N) LD driver circuits which supply the driving current to the LD 10 when the light-emitting signal that controls the emission of the LD 10 is input. The light-emitting signal is output to one of the N LD driver circuits D1 to DN. The N LD driver circuits D1 to DN each have a different target current value for the driving current.

In this instance, for example, according to the distance to the subject, the LD 10 can be driven by the LD driver circuit having the preferable target current value for the driving current. Thereby the distance can be measured stably (accurately), and the measurement error in the measured distance can be reduced.

As a result, the accuracy for measuring the distance to the subject can be improved.

In addition, the N LD driver circuits D1 to DN each have a different response time (response speed) to the light-emitting signal. Each response time of the N LD driver circuits becomes longer as the target current value becomes larger. In other words, the response speed to the light-emitting signal of each of the LD driver circuits becomes lower as the target current value for the LD driver circuit becomes larger.

In this instance, according to the distance to the subject, for example, the LD 10 can be driven by the LD driver circuit having the preferable target current value and the preferable response time. Thereby, the range-finding operation can be performed stably and accurately while achieving electrical power saving.

In the present Embodiment, an automobile on which the range finder 100 is mounted can be provided. In such an automobile, the ECU can control the motion of the automobile (speed control, for example) accurately according to the measurement result of high accuracy by the range finder 100.

Figure 7:
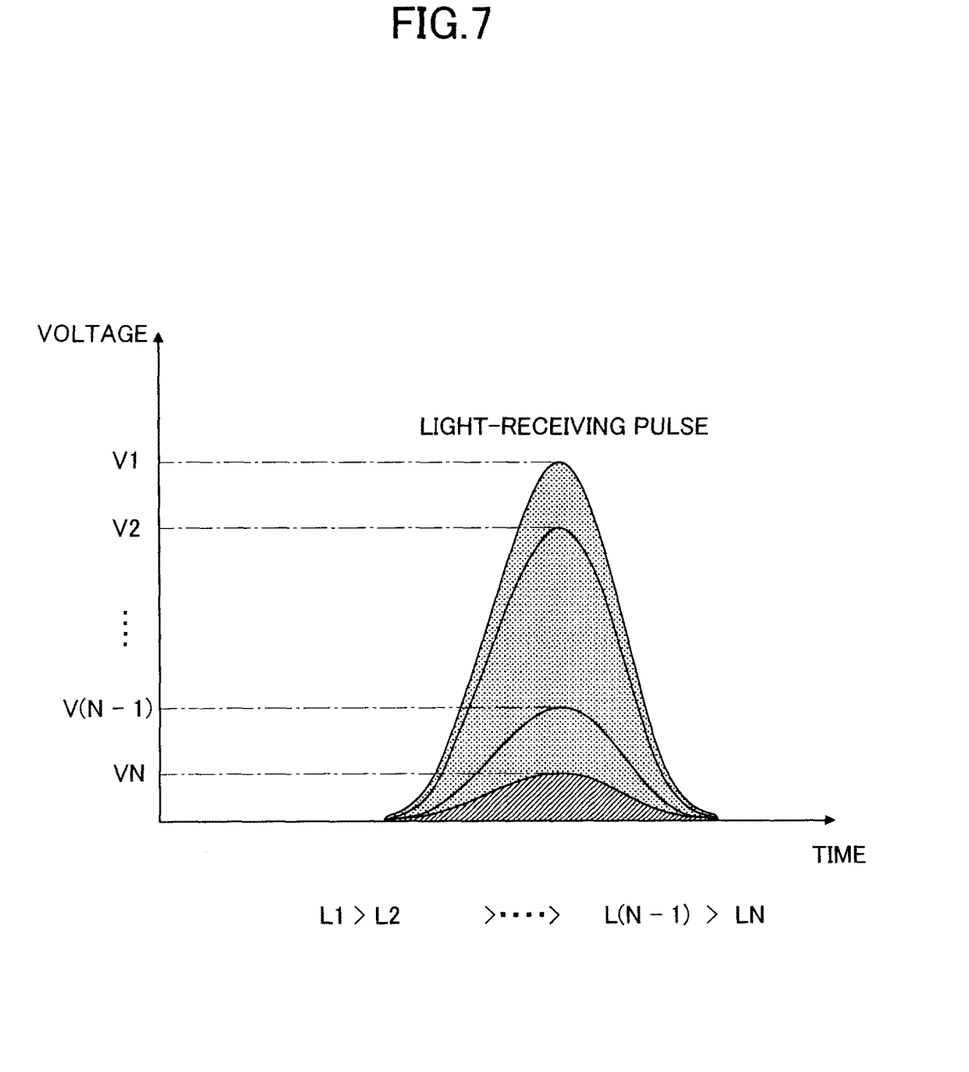
FIG. 7 is an explanatory diagram illustrating N thresholds V1 to VN of signal strength of a light-receiving signal set by a measurement controller of Modified example.

Next, a range finder 200 according to Modified example will be described with reference to the FIG. 7 and FIG. 8. The range finder 200 includes essentially similar configurations and functions to the range finder 100 according to the above-described Embodiment except that the control process in the measurement controller is different from that in the range finder 100.

The range finder 200 selects a LD driver circuit according to the signal strength of the light-receiving signal (light-receiving pulse) according to the reflected light from the subject. Herein, as shown in FIG. 7, the range of the signal strength V (strength range) of the light-receiving signal which can be detected by the PD output detector 20 is separated into N−1 strength ranges such as V2–V1, ..., VN–V(N−1). Herein, V1>V2> ... >VN is satisfied. The flow chart shown in FIG. 8 is based on the processing algorithms performed by the measurement controller.

In the first step J1, the light-emitting signal S1 is output to the LD driver circuit D1. As a result, the driving current having the target current value I1 is supplied from the LD driver circuit D1 to the LD 10 and the LD 10 emits light of the optical output P1. Thus, firstly, in order to detect the subject accurately, the LD 10 is driven by the LD driver circuit D1 having the largest target current value (having highest output) for the driving current so as to emit light of the optical output P1.

In the next step J2, it is determined whether the subject is detected or not. Herein a positive detection is determined when the light-receiving signal from the PD 18 according to the light-emitting pulse of the optical output P1 emitted by the LD 10 is detected by the PD output detector 20. A negative detection is determined when such a signal is not detected by the PD output detector 20. For example, when the distance to the subject L is significantly longer than the distance L1 (100 meters, for example), the subject cannot be detected. When the determination in the step J2 is positive, the step then goes to the step J3. On the other hand, when the determination in the step J2 is negative, the operation flow is terminated.

In the step J3, the signal strength V of the light-receiving signal is calculated and obtained. Herein, the signal strength V is calculated using the light-emitting pulse of the optical output P1 according to the light-emitting signal S1.

In the next step J4, it is determined whether the measurement operation of the distance L is continued or not. Herein, the positive detection is determined when the automatic driving mode for the automobile is selected by the user, for example. The negative detection is determined when such a mode is not selected. When the determination in the step J4 is positive, the step then goes to the step J5. On the other hand, when the determination in the step J4 is negative, the operation flow is terminated.

In the step J5, n is set to be N. The step then goes to the step J6 after the step J5 is executed.

In the next step J6, it is determined whether the signal strength V is Vn or more. When the determination in the step J6 is negative, the step then goes to the step J7. On the other hand, when the determination in the step J6 is positive, the step then goes to the step J10.

In the step J7, the light-emitting signal Sn is output to the LD driver circuit Dn. As a result, the driving current of the target current value In (1≤n≤N) is supplied to the LD 10 from the LD driver circuit Dn. Thereby the LD 10 emits light of the optical output Pn (1≤n≤N). The step then goes to the step J8 after the step J7 is executed.

In the next step J8, the distance L is measured using the light-emitting pulse of the optical output Pn according to the light-emitting signal Sn. The measured distance L is output to the ECU of the automobile. The step then goes to the step J9 after the step J8 is executed.

In the step J9, the signal strength V of the light-receiving pulse corresponding to the light-emitting pulse of the optical output Pn according to the light-emitting signal Sn is calculated and updated (obtained). The step then goes back to the step J4 after the step J9 is executed.

In the step J10, n>1 is determined. When the determination in the step J10 is positive, the step then goes to the step J11. On the other hand, when the determination in the step J10 is negative, the operation flow is terminated.

In the step J11, n is decremented. The step then goes back to the step J6 after the step J11 is executed.

As described above, the light-emitting signal Sn is output to the LD driver circuit Dn having the preferable response speed and the preferable optical output according to the signal strength (that is, strength range) of the light-receiving signal. Thereby, the LD 10 is driven by the LD driver circuit Dn. As a result, according to the signal strength V of the light-receiving signal, the range-finding operation can be performed with the high range resolution while keeping the preferable optical output when the subject has a high reflection ratio and when the distance to the subject is short. Namely, according to the reflection ratio of the subject and the distance to the subject, the range-finding operation can be performed with the preferable range resolution.

The above-described range finder 200 of Modified example outputs the light-emitting signal to one of the N LD driver circuits D1 to DN so as to obtain the signal strength of the light-receiving signal (strength of the reflected light from the subject). The range finder 200 outputs the light-emitting signal to the LD driver circuit having the response speed to the light-receiving signal according to the obtained signal strength so as to measure the distance to the subject.

A range-finding method using the range finder 200 according to Modified example includes a step to emit light from the LD 10 by outputting the light-emitting signal to one of the N LD driver circuits D1 to DN each having a different response time (response speed) to each light-emitting signal so as to obtain the signal strength of the light-receiving signal (strength of the reflected light from the subject). The range-finding method using the range finder 200 also includes a step to emit light from the LD 10 by outputting the light-emitting signal to the LD driver circuit having the response speed according to the obtained signal strength so as to measure the distance to the subject.

In the range finder 200 and the range-finding method of the Modified example, the LD driver circuit for outputting the light-emitting signal can be changed according to the obtained signal strength that is, the reflection ratio of the subject and the distance to the subject.

Thereby, the distance to the subject can be measured with high range resolution by accelerating the response speed to the light pulse as the signal strength becomes higher (as the reflection ratio of the subject becomes higher and/or the distance to the subject becomes shorter). The distance to the subject can be measured accurately by enlarging the optical output of the light pulse as the signal strength becomes lower (as the reflection ratio of the subject becomes lower and/or the distance to the subject becomes longer).

In addition, the measurement controller outputs the light-emitting signal to the LD driver circuit having the shorter response time as the obtained signal strength becomes large. In other words, the measurement controller outputs the light-emitting signal to the LD driver circuit having the higher response speed to the light-emitting signal as the obtained signal strength becomes higher.

In this instance, the response speed and the optical output of the light pulse can be controlled preferably according to the variation in the signal strength to be obtained.

Figure 8:
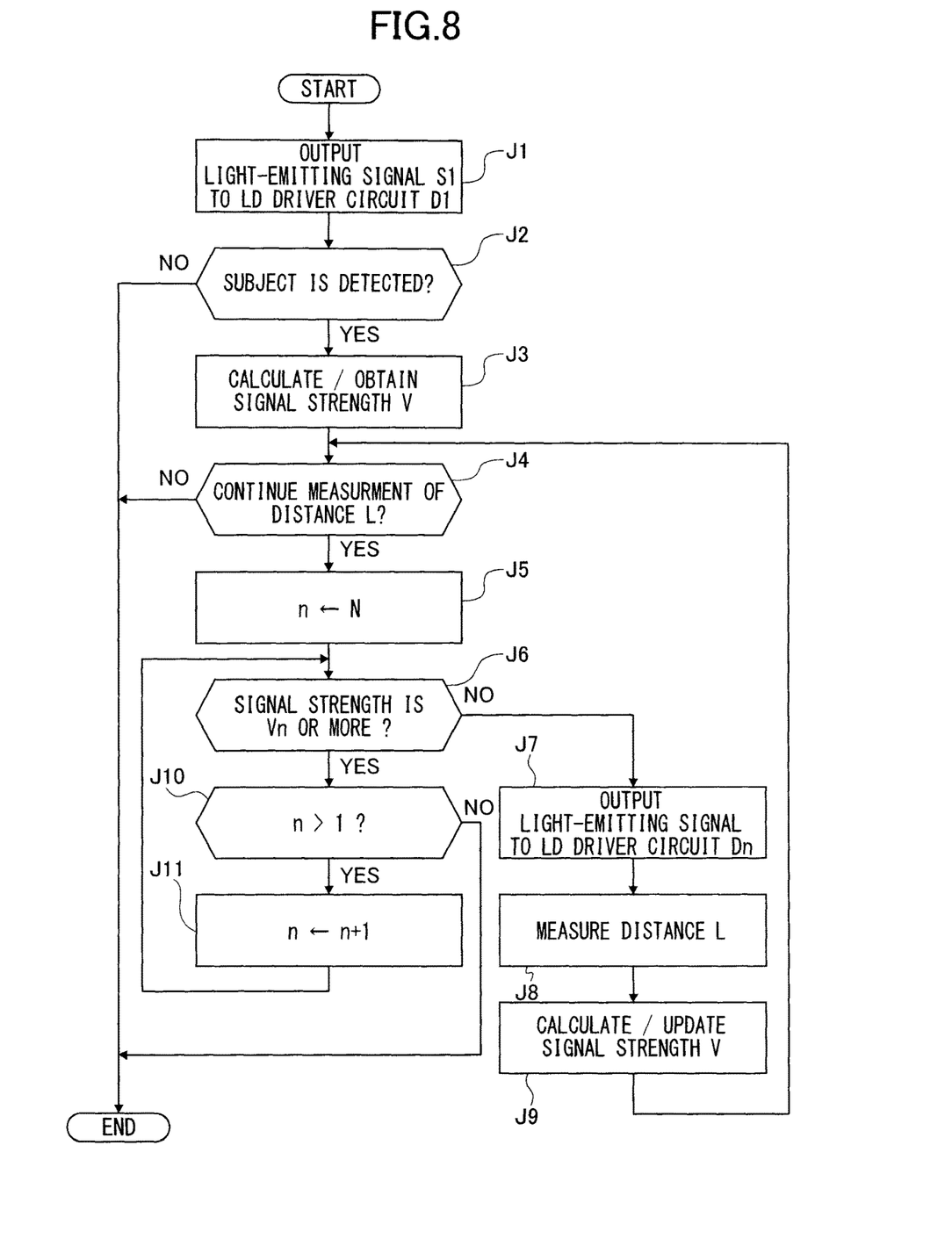
FIG. 8 is a flow chart illustrating a control process performed by the measurement controller of Modified example

In the flow chart shown in FIG. 8, the step J8 and the step J9 can be operated in reverse. The step J4 is not necessarily performed. That is, the step J5 can be executed next after the step J3. In this instance, the step then goes back to the step J5 after the step J9 is executed.

In the above-described Embodiment and Modified example, one type of LD is used as the light source, but it is not limited to the above. For example, the light source is selectable from an LD array in which a plurality of LDs are arranged one-dimensionally or arranged two-dimensionally, a VCSEL (surface-emitting laser) as one of a semiconductor laser, a VCSEL array in which the VCSEL is arranged one-dimensionally or arranged two-dimensionally, a laser other than the semiconductor laser, an LED (light-emitting diode), an LED array in which a plurality of LEDs are arranged one-dimensionally or arranged two-dimensionally, an organic EL element, an organic EL array in which a plurality of organic EL elements are arranged one-dimensionally or arranged two-dimensionally and so on. As the LD array in which a plurality of the LDs are arranged one-dimensionally, a stacked-type LD array having a plurality of stacked LDs and the LD array having a plurality of LDs arranged alongside can be used.

In the above-described Embodiment and Modified example, the waveform of the light-emitting signal and the driving current is a block pulse, but it is not limited to this. It can be another waveform such as a trapezoidal wave, an A-frame wave, a saw-tooth wave, and a sine-wave form. Herein, obviously, the waveform of the driving current is approximately the same as the waveform of the light-emitting signal.

In addition, the configurations of the range finders according to the above-described Embodiment and Modified example can be changed preferably. For example, the irradiation optical system does not always include the irradiation lens or the optical deflector, but can include another optical element (like a mirror). The light-receiving optical system does not always include the light-receiving lens, but can include another optical element (like a mirror).

In addition, in the above-described Embodiment and Modified example, the automobile is described as the mobile object on which the range finder is mounted, for instance. However, the mobile object can be a vehicle other than an automobile such as an electric train, an airplane, a helicopter, and a ship.

As described above, the range finder according to the Embodiment and Modified example is a range finder using a so-called Time-of-Flight (TOF) method which measures the round-trip distance to the subject. The range finder is used not only for a sensing operation in the mobile object but can be used in a broader range of industrial fields such as a motion-capture technology, and a range-finding apparatus. That is, the range finder according to the Embodiment and Modified example is not always mounted on the mobile object.

As described above, the range finder and the range-finding method according to the Embodiment and Modified example are specifically effective in the TOF method which measures the distance by the time difference between the rising timing of the light-emitting signal and the timing on which the rising waveform of the light-receiving pulse exceeds the threshold. In the TOF method, as the response time of the light-receiving pulse becomes longer, the timing on which the rising wave form exceeds the threshold according to the signal strength includes an error easily. Therefore, the range resolution is deteriorated in the range-finding operation. Such a phenomenon occurs significantly as the LD driver circuit becomes longer since there is a tendency such that the response speed becomes lower as the output becomes higher according to the fundamental characteristics of the transistor that drives the light source in the LD driver circuit. Therefore, in the range finder and the range-finding method according to the Embodiment and Modified example, a preferable range resolution can be achieved in the range-finding operation of both long distance and short distance by changing the LD driver circuit from the LD driver circuit having the higher output and the lower response speed to the LD driver circuit having the lower output and the higher response speed according to the measurement distance and/or the reflective ratio of the subject.

In short, in the range finder and the range-finding method according to the Embodiment and Modified example of the present invention, the range-finding operation is performed by the high-output LD driver circuit in the long-distance measurement such that it is difficult to obtain the signal strength of the light-receiving pulse by the reflected light from the subject. The range-finding operation is performed by the high-speed response LD driver circuit in the short-distance measurement such that the signal strength of the light-receiving pulse can be obtained easily.

According to the Embodiment of the present invention, the accuracy in the range-finding operation to measure the distance to the subject can be improved.

Although the Embodiment of the present invention has been described above, the present invention is not limited thereto. It should be appreciated that variations may be made in the embodiments described by persons skilled in the art without departing from the scope of the present invention.

What is claimed is:

1. A range finder which irradiates a subject by emission of a light source, and receives reflected light from the subject so as to measure a distance to the subject, the range finder comprising;
   a plurality of light-source-driving circuits supplying a driving current to the light source when a light-emitting signal that controls the emission of the light source is input, wherein
   the light-emitting signal is output to one of the light-source-driving circuits, and
   each of the light-source-driving circuits has a different response speed to the light-emitting signal,
   the range finder further comprising:
   a measurement controller obtaining the distance to the subject by outputting the light-emitting signal to one of the light-source-driving circuits, and outputting the light-emitting signal to the light-source-driving circuit having the response speed according to the obtained distance, so as to measure the distance to the subject.

2. The range finder according to claim 1, wherein
   each of the light-source-driving circuits has a different target current value of the driving current, and the response speed of each of the light-source-driving circuits is increased with a decrease of the target current value.

3. The range finder according to claim 1, wherein the measurement controller outputs the light-emitting signal to the light-source-driving circuit of which the response speed is increased with a decrease of the obtained distance.

4. The range finder according to claim 1, wherein each of the light-source-driving circuits includes a transistor as a current source of the driving current, and a current amplification factor of the transistor in each of the light-source-driving circuits is different from each other.

5. A mobile object comprising the range finder according to claim 1.

6. A range finder which irradiates a subject by emission of a light source, and receives reflected light from the subject so as to measure a distance to the subject, the range finder comprising;
a plurality of light-source-driving circuits supplying a driving current to the light source when a light-emitting signal that controls the emission of the light source is input, wherein
the light-emitting signal is output to one of the light-source-driving circuits, and
each of the light-source-driving circuits has a different response speed to the light-emitting signal,
the range finder further comprising:
a measurement controller outputting the light-emitting signal to one of the light-source-driving circuits, obtaining strength of the reflected light from the subject, and outputting the light-emitting signal to the light-source-driving circuit having the response speed according to the obtained strength, so as to measure the distance to the subject.

7. The range finder according to claim 6, wherein the measurement controller outputs the light-emitting signal to the light-source-driving circuit of which the response speed is increased with the increase of the obtained strength.

8. The range finder of claim 6, wherein each of the light-source-driving circuits has a different target current value of the driving current, and the response speed of each of the light-source-driving circuits is increased with a decrease of the target current value.

9. The range finder of claim 6, wherein each of the light-source-driving circuits includes a transistor as a current source of the driving current, and a current amplification factor of the transistor in each of the light-source-driving circuits is different from each other.

10. A mobile object comprising the range finder of claim 6.

11. A range-finding method for measuring a distance to a subject by irradiating the subject by emission of a light source, and receiving reflected light from the subject, the range-finding method comprising;
obtaining the distance to the subject by emission of the light source by outputting a light-emitting signal that controls an emission of the light source to one of a plurality of light-source-driving circuits each having a different response speed to the light-emitting signal, and
measuring the distance to the subject by the emission of the light source by outputting the light-emitting signal to the light-source-driving circuit having the response speed according to the obtained distance.

* * * * *